Jan. 5, 1954  C. OTTO  2,665,242
COKE OVEN HEATING WALLS
Filed Nov. 9, 1949  2 Sheets-Sheet 2
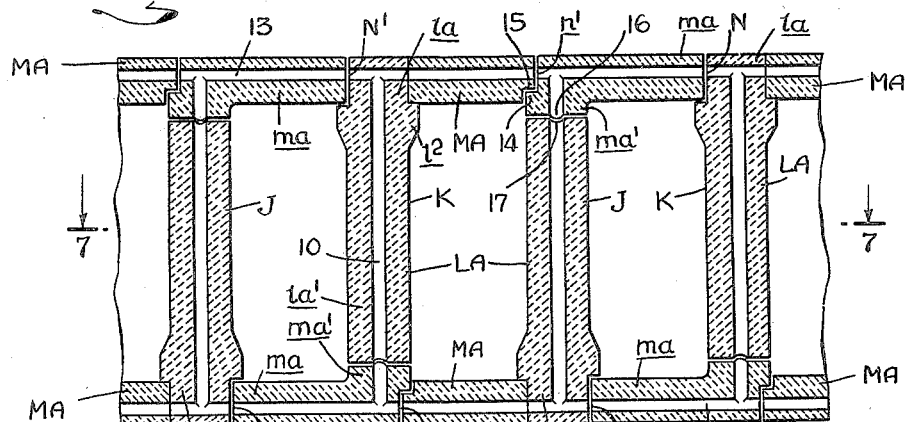
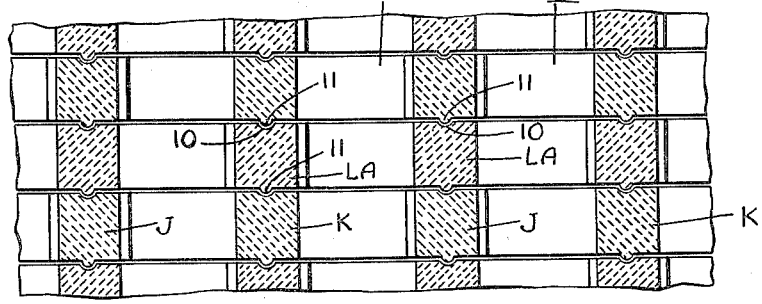
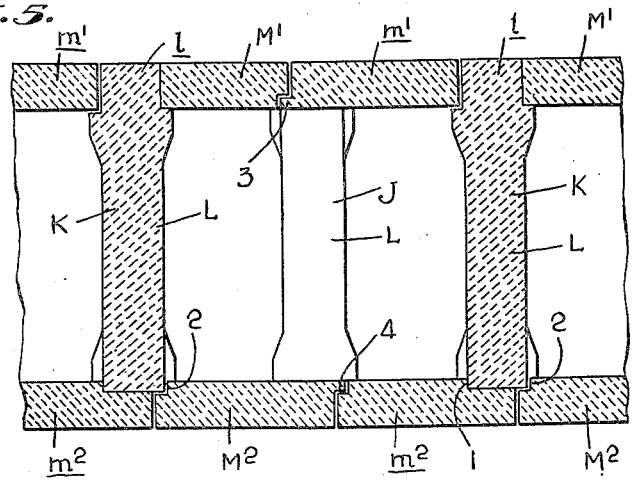
INVENTOR
CARL OTTO
BY John E. Hubbell
ATTORNEY Patented Jan. 5, 1954

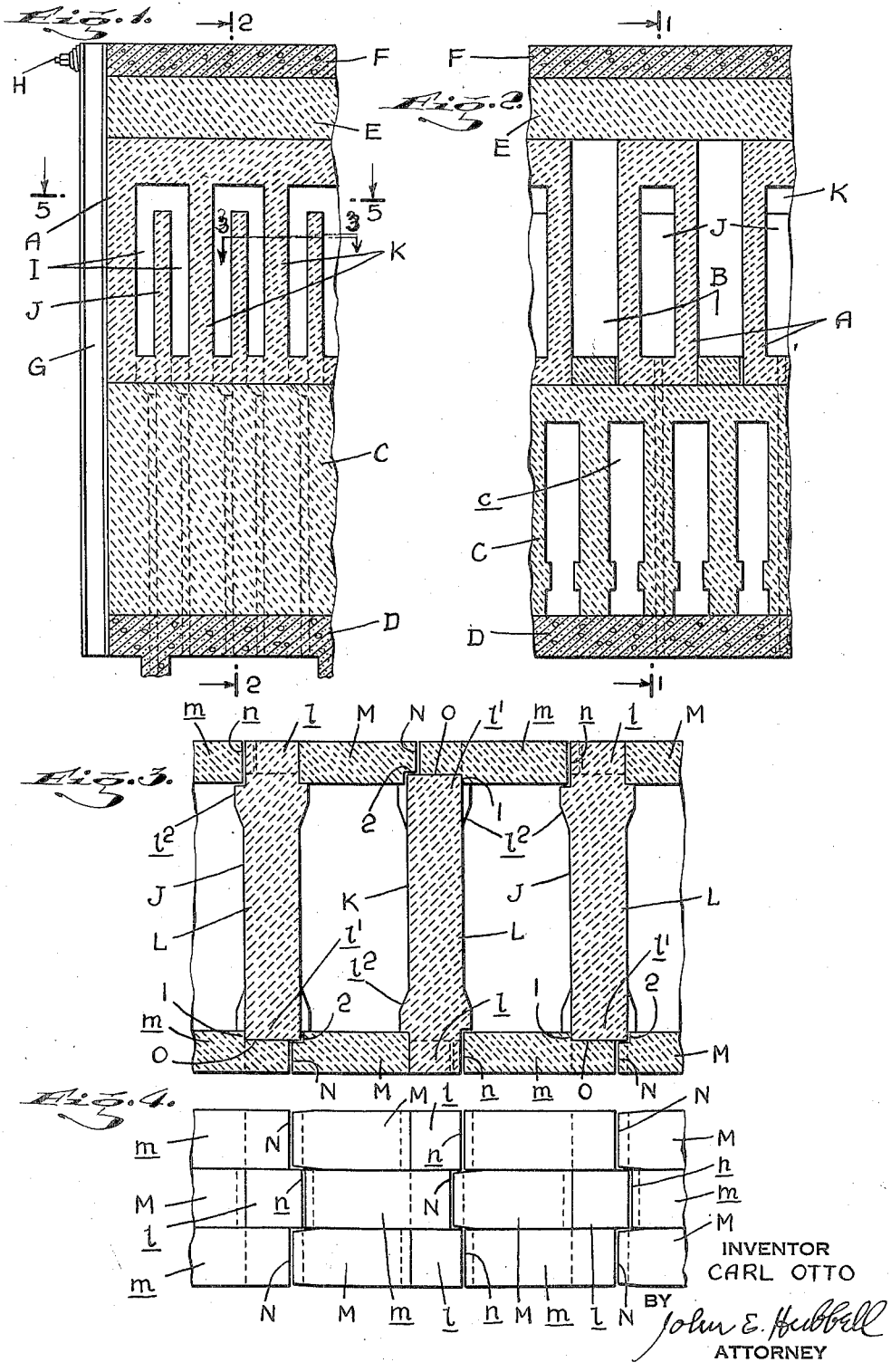

2,665,242

UNITED STATES PATENT OFFICE 2,665,242

COKE OVEN HEATING WALLS

Carl Otto, Manhasset, N. Y.

Application November 9, 1949, Serial No. 126,338

5 Claims. (Cl. 202—268)

The present invention relates to the brickwork of coke oven batteries of the type in which horizontally elongated vertical heating walls extend transversely to the battery between the opposite sides of the latter, and alternate longitudinally of the battery with coking chambers. In such coke oven batteries, it is now and long has been customary to make the heating walls, and the oven chamber top and bottom walls of silica bricks, and to make the main roof portion of the coke oven battery, and the regenerator structure underlying the coking chambers, of clay bricks. As is well known, the thermal coefficient of expansion of silica bricks is much higher than the thermal coefficient of expansion of clay bricks, so that when such a battery is heated up, the silica bricks expand to a substantial extent relative to the expansion of the clay bricks. The conventional battery is formed with expansion joints restricting the elongation of the battery, but includes no expansion joint restricting an increase in the width of the battery as the bricks heat up and expand.

In consequence of the relatively great expansion of the silica bricks and the relatively small expansion of the clay bricks occurring when the battery is initially heated up, the resultant expansion in the width of the battery then occurring tends to cause serious future deterioration of the silica brickwork, as a result of the shrinkage of the bricks which occurs when the battery is allowed to cool down, as is practically desirable from time to time. When such cooling down occurs in a coke oven structure of conventional type, it subjects the silica brickwork to tension stresses which produce brickwork cracks and wide open brickwork joints, with resultant gas leakage when the battery is again heated up.

In my prior application, Serial No. 730,169, filed February 21, 1947, abandoned since the instant application was filed, I have disclosed and claimed a coke oven structure in which vertical expansion joints extending longitudinally of the battery are formed in the oven heating walls at relatively short intervals along the length of each wall. When an oven battery having expansion joints in its heating wall which extend longitudinally of the battery, and are distributed along the length of the heating wall is allowed to cool down, the effect of the resultant brick contraction is distributed along the length of the heating wall and tends to open each expansion joint therein to a relatively small extent, and the risk of brick fractures with wide cracks or widely open joints is largely eliminated. In said prior application, the expansion joints in each heating wall, are formed in flue division walls extending transversely to the length of the heating wall and separating adjacent vertical heating flues, and each expansion divides the corresponding flue division wall into two sides by sections, with the result that each such division wall must be weaker, or thicker than is desirable.

The general object of the present invention is to provide a heating wall construction characterized by its inclusion of vertical expansion joints which extend transversely to the length of the heating wall, i. e., longitudinally of the battery, and do not split the flue division walls, but are confined to portions of the heating wall brickwork directly interposed between the heating wall flues and adjacent coking chambers. In the preferred form of the invention, the bricks which form the flue walls separating the flue spaces from the heating chambers, comprise bricks extending longitudinally of the heating walls in alternate courses, and having end portions extending into socket like spaces between adjacent bricks and tapered to facilitate the movements of said end portions into and out of the corresponding socket spaces.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a vertical section through a portion of a coke oven battery, taken on the line 1—1 of Fig. 2;

Fig. 2 is a section on the line 2—2 of Fig. 1;

Fig. 3 is a horizontal section through a portion of an oven heating wall, taken on the line 3—3 of Fig. 1;

Fig. 4 is an elevation of the wall portion shown in Fig. 3;

Fig. 5 is a section on the line 5—5 of Fig. 1;

Fig. 6 is a section taken similarly to Fig. 3 illustrating a heating wall modification; and Fig. 7 is a partial section on the line 7—7 of Fig. 6.

In Figs. 1 to 5, I have illustrated a horizontal coke oven battery of conventional type, except for the arrangement of the heating wall brickwork to provide a multiplicity of vertical expansion joints Nn in each of the oven heating walls A. In the conventional type of coke oven battery illustrated, heating walls A alternate with coking chambers B, which, like the heating walls extend from one side of the battery to the other. C represents a conventional regenerator portion of the battery beneath the oven chambers and heating walls, and is supported by a concrete deck or slab D. When the battery is of the underfired type, the slab D is supported on pillars extending upward through the battery basement space. The battery structure comprises a brickwork roof body E and a concrete cover-plate F above the roof E. Vertical buckstays G are provided at the sides of the battery in abutting relation with the ends of the heating walls, and tie rods H of adjustable effective length, connect the buckstays at the opposite ends of the heating walls, each buckstay engaging one end of a heating wall being connected by a corresponding tie rod H to the buckstay engaging the other end of the heating wall. In the conventional type of coke oven battery illustrated, the heating walls are formed of silica bricks, while the roof body E and the vertical walls of the regenerator structure C are formed of clay bricks. Customarily, the portion of the battery structure between the oven chamber floors and the tops of the regenerator chambers c are also formed of silica bricks.

Each heating wall is formed with a row of vertical heating flue sections I, shown as connected at their upper ends in pairs to form conventional hair pin flues. The two flue sections I of each hair pin flue, are separated by a corresponding flue division wall J, and the adjacent pairs of twin flues in each heating wall, are separated by flue division walls K. As shown in Figs. 1 to 4, the flue division walls J and K are identical in construction, except that the tops of the division walls J are at a lower level than the upper ends of the division walls K, to thereby provide for a passage above each wall J connecting the adjacent flue sections I and constituting the yoke portion of the corresponding twin flues. As shown, each of the flue division walls J and K is formed by similar binder or cross tie bricks L. The flues I are separated from the adjacent coking chambers B, by liner bricks M and m, below the level of the tops of the division walls J, and by bricks M', M², and m' and m² above that level.

One end $l$ of each binder brick L extends to and is flush with the side of the adjacent coking chamber, and constitutes a tenon extending into a socket space formed by adjacent liner bricks M and m. The opposite end $l'$ of the binder brick does not extend to the coking chamber adjacent that end of the binder brick, as the length of each binder brick is less than the width of the heating wall of which it forms a part. The adjacent superposed binder bricks L in each flue division wall are turned end for end, and the brick L in each course has its tenon end $l$ projecting beyond the ends $l'$ of the bricks L in adjacent courses of the same flue division wall.

The heating wall liner bricks M and m are elongated in the direction of the length of the heating wall and are arranged in superposed horizontal courses extending between the opposite sides of the battery and each of the bricks M and m. Each course includes a plurality of sections each of which consists of a brick M and a brick m in end-to-end relation and extending between the tenon portions $l$ of the binder bricks L in two flue division walls which are separated from one another by two flues I and one division wall J or K. In each course, the liner bricks are longitudinally displaced relative to the bricks in the courses immediately above and below it. Each of the binder bricks L has its tenon end $l$ extending to and defining a portion of the coking chamber at one side of the heating wall, and has its end $l'$ received in a shallow recess O, formed partly in one and partly in the other of the adjacent ends of two end-to-end bricks M and m at the opposite side of the heating wall. A major portion of each such recess O is formed by a corner notch elongated in the direction of the heating wall length which is in the corresponding brick m, and the remainder of the recess is formed by a corner notch 2 in the corresponding brick M which is shorter than the notch 1.

The abutting ends of the two bricks M and m which collectively define each recess O, are separated by a vertical expansion joint section N, and the other end of the brick m is separated by an expansion joint section n. At each end of each flue division wall expansion joint sections N in alternate brick courses and expansion joint sections in the intermediate courses unite to form a zig-zag expansion joint Nn.

As shown, the end of each brick M separated from an abutting end of an adjacent brick m by an expansion joint section N, has its upper and lower sides cut away to form a tapered brick end portion or tenon. The latter is received in a brickwork socket having upper and lower horizontal walls formed by the bottom and top walls of the immediately adjacent binder brick tenons $l$ in the courses respectively above and below the brick M. The vertical inner side of each such socket is formed by the end $l'$ of a binder brick L. Each expansion joint section n extends between the unrabbeted end of the corresponding brick M and the adjacent side of the tenon portion $l$ of the adjacent brick L in the same course. The risk of gas leakage between the tenon portion $l$ of each binder brick L and the adjacent ends of the line bricks at the opposite sides of the tenon $l$, is substantially reduced by lateral rib projections or shoulders $l^2$ of the binder bricks which overlap the inner sides of the adjacent line bricks M and m.

The described arrangement of the bricks L and M and m of each heating wall, provides a vertical expansion joint N or n in each brick course below the tops of the walls J at each end of each flue division wall comprising sections N and n. As previously noted, each joint section N is overlapped by the end surface of the end $l'$ of an adjacent binder brick L, and each joint section n is overlapped by an adjacent binder brick shoulder $l^2$. While the dimensions of the heating wall bricks and flue spaces may vary, it is noted by way of illustration and example, that in a particular coke oven design of the form illustrated in Figs. 3 and 4, each of the vertical flue division walls is six inches thick; the width of each flue space I, measured in the direction of the length of the corresponding heating wall, is 12½ inches; the width of each expansion joint space N and n is $\frac{3}{16}$ of an inch; the thickness of each heating wall is two feet 11½ inches; and the maximum horizontal extent of each of the projections or shoulder $l^2$ is one inch. The foregoing dimensions are those existing in the battery prior to its initial heating up. The height and length of the heating wall may vary with the battery overall design. In the usual designs of a horizontal chamber, coke oven battery, the battery is usually more than forty feet wide but in rapid heating coke oven battery having unusually narrow and high coking chambers, the width of the battery may well be not much more than twenty feet.

The expansion of a silica brick, when initially heated up to heating wall operating temperature is of the order of 1½% and with the oven dimensions stated, the major portion of the longitudinal expansion of the liner bricks will normally be taken up in closing the joint sections N and n. When the oven is subsequently cooled down, the contraction in the direction of the length of the heating wall may be expected to open the joint sections N and n with little or no tendency to form other cracks or wall openings in any portion of the heating wall. As is well known to those skilled in the art, while mortar is customarily placed in the joints between the adjacent bricks, the primary purpose of the mortar is to compensate for irregularities in the abutting surfaces of adjacent bricks, since the composition of the mortar required to withstand the high heating wall temperature is such that the mortar has practically no binding action tending of itself to prevent relative movements of adjacent bricks. However, with the construction described, there will be substantially less frictional resistance to the opening of the joint sections N and n when the heating wall bricks contract, than there will be to open the other vertical joints between the heating wall bricks. The provision of the multiplicity of vertical heating joints in each heating wall permits the bricks to expand and contract with the production of a relatively small fraction only, of the elongation and contraction in the heating wall length which occurs in coke oven batteries of the type now in general use in which there are no heating wall expansion joints extending longitudinally of the battery.

As shown in Figure 5, the heating wall portion above the level of the tops of the flue division walls J, and between the yoke portions of the twin flues and an adjacent oven chamber are formed by a single course of bricks comprising liner bricks M', m', M² and m², and the binder bricks L forming the portions of the walls K included in said course. As shown in Fig. 5, the binder bricks M' and m' are arranged end-to-end between the tenons l of each adjacent pair of binder bricks L included in said course. As shown in Fig. 5, the binder brick tenons l and the bricks M' and m' are all included in the portion of the heating wall at the upper side of the figure. Each brick M' is similar in horizontal cross-section to the bricks M of Fig. 3. Each brick m' differs from the bricks m of Fig. 3 in that it does not included a corner notch 1, and in that it includes a rib projection 3 extending into the corner notch 2 of the adjacent brick M'. Each brick M² is substantially longer than the brick M', and at its end remote from the associated wall K is formed with a rib projection 4 like the projection 3 of the brick m'. The rib projection 4 of the brick M² is received in a corner notch 5 formed in the adjacent brick m². The opposite end of the brick m² engages and overlaps the end l' of a binder brick L in the adjacent wall K, and is formed with an elongated corner notch 6 like the corner notch 1 of the bricks m, and is otherwise shaped like the end of a brick m engaging the end l' of a binder brick L as shown in Fig. 3.

In Figs. 6 and 7, I have illustrated a modification of the invention in which the heating wall bricks M, m and L of Figs. 1 to 4, are replaced by somewhat differently shaped bricks MA, ma, and LA respectively. Each brick LA is shorter, relative to the heating wall width, than are the bricks L, and the end la' of each brick LA engages a lateral projection ma' formed for the purpose at the inner side of a corresponding line brick ma. The tenon end la of each binder brick LA extends into an open ended socket which is surrounded by portions of liner bricks MA and ma, as each of the sockets receiving the tenon end l of a brick L is surrounded by portions of liner bricks M and m in the construction first described. Each brick LA is formed with a central longitudinal groove 10 in its upper side and with a central longitudinal rib 11 at its lower side, so that in each heating wall the rib 11 at the under side of each upper brick LA enters the groove 10 in the upper side of the subjacent brick LA, as is shown in Fig. 7.

The bricks ma differ in form from the bricks m of Figs. 3 and 4, in various respects aside from their lateral projections ma'. Thus the bricks ma and also the bricks MA are formed with central grooves 13 in their upper sides and with central ribs at their under sides to enter the grooves 13 in the upper sides of the bricks MA and ma beneath them. Also the bricks MA and ma are not rabbeted to form notches like the notches O shown in Fig. 4. Furthermore, the end of each brick ma at which its projection ma' is located, is formed with a rib projection 14 at its inner side which is overlapped by a portion 15 of the adjacent brick MA. As shown also, the vertical abutting surfaces of the projection ma' of each liner brick ma and the end la' of the corresponding binder brick LA are formed with vertical rib 16 and a mating vertical groove 17, respectively. Those mating parts anchor each of the bricks ma to the flue division wall in which its projection ma' is incorporated. The bricks MA may be similar to the bricks M, except for their upper side grooves 10 and lower side ribs 11.

As shown in Fig. 6, each expansion joint section N' is between the tenon end la of a binder brick LA, and the adjacent end of the adjacent liner brick ma engaged by said tenon end, and the other end of the brick ma is separated from the adjacent end of the adjacent brick MA by an expansion joint section n'. The bricks ma at the same level between adjacent flue division wall J and K move longitudinally relative to one another when the extension joints open, since one of the bricks mb is anchored to one, and the other is anchored to the second of the two flue division walls.

The bricks MA and ma shown in Figs. 6 and 7, may be replaced in the brick course above the tops of the flue division walls J, by bricks modified in shape to account for the omission from the course of bricks forming parts of the wall J, in a manner analogous to that followed in the construction illustrated in Figs. 3–5. As will be apparent, the tongue and groove connection between the binder and liner bricks in adjacent courses, is especially desirable in connection with the bricks included in the course immediately above the tops of the walls J. It hardly needs to be pointed out that the tongue and groove connections between the bricks in adjacent courses illustrated in Figs. 6 and 7 may be used with bricks otherwise shaped as shown in Figs. 3, 4 and 5.

In the drawings, the vertical expansion joints are shown by spaced apart double lines and the other vertical joints are shown by a single line. Such a joint showing is appropriate to the condition of the brickwork when the oven structure after being operated at its working temperature, is allowed to cool off. As originally constructed, each of the vertical joints may be of the same width and are filled with mortar. However, most of that mortar is squeezed out by the expansion of the bricks when the oven is first heated up to its working temperature. When the cooled down oven is again heated up, the open expansion joints tighten up, but ordinarily they do not initially tighten up sufficiently to present some leakage. That leakage condition which then develops is self-healing however, in that it results in graphite deposits in the leaking joints which soon seals the joints and make the furnace walls practically gas tight. As those skilled in the art know, the brick walls of no practical coke oven making metallurgical coke are ever gas tight in the sense that its joints will not leak when the differential between the gas pressures at the opposite edges of the joints is increased much above its small normal value.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In a coke oven battery of the known type having transverse, horizontally elongated coking chambers and heating walls between the coking chambers, each heating wall including vertical flue spaces, and being formed of superposed courses of bricks made of refractory material having a relatively high coefficient of thermal expansion and arranged to form transverse, vertically extending, flue walls and coking chamber side walls, and in which each flue space is separated from an adjacent coking chamber by a vertical side wall section comprising superposed courses of liner bricks with the bricks in each two adjacent superposed courses longitudinally disposed so that at each vertical edge of said section the end of one brick in each two adjacent courses projects beyond the corresponding end of the brick in the other course to thereby form horizontal tenons, and in which the bricks included in the adjacent portion of the heating wall are arranged to form socket spaces receiving the tenons of the adjacent vertical edge of said section; the improvement in which the portions of the bricks forming the horizontal tenons at one of the two sides of each section and the bricks in the adjacent portion of the heating walls which overlap the last mentioned tenons are shaped and arranged to form sections of a vertical expansion joint between said one side edge and the adjacent wall portion with each pair of overlapping tenons and socket brick surfaces at said one side of the section separated by a narrow, horizontally extending space which diminishes in vertical extent as the distance from the end of the tenon increases, whereby the frictional resistance to the opening of said vertical expansion joint is relatively small.

2. An improvement as specified in claim 1 in which the aggregate extent of surfaces of the bricks at one edge of a side wall section in overlapping relation with surfaces of the bricks in the adjacent flue division wall is substantially smaller at the said one edge of said section than at said second edge of said section.

3. An improvement as specified in claim 1 in which the overlapping surfaces of tenon and socket forming bricks at said one edge of each section are inclined relative to one another to facilitate the movement of said one edge away from the flue division wall adjacent thereto.

4. In a coke oven battery of the known type comprising horizontally elongated coking chambers and heating walls alternating with the coking chambers along the length of the battery and each formed with a row of vertical heating flues extending from one end of the heating wall to its other end, the improved heating wall construction comprising superposed horizontal binder bricks forming flue division walls between adjacent flues, superposed liner bricks forming a separate wall unit between each vertical flue and an adjacent coking chamber, each such unit comprising liner brick portions overlapping the end portions of the binder bricks included in the flue division walls at the opposite sides of the last mentioned flue and said liner bricks cooperating with one of said flue division walls to form a vertical expansion joint, and said liner bricks being shaped and arranged to contact with a portion of the aggregate end surface area of the binder bricks which is smaller in the case of the last mentioned flue division wall than in the case of the other flue division wall, overlapped by said brick portion.

5. A heating wall construction as specified in claim 4, in which each separate wall unit includes a plurality of brick courses arranged one above another and each consisting of a single liner brick, and in which the two liner bricks of directly superposed courses are of unequal length

CARL OTTO.

References Cited in the file of this patent

UNITED STATES PATENTS

| Number | Name | Date |
|---|---|---|
| 1,745,131 | Van Ackeren | Apr. 8, 1930 |
| 1,928,595 | Koppers | Sept. 26, 1933 |
| 2,141,035 | Daniels | Dec. 20, 1936 |
| 2,158,139 | McIntire | May 16, 1939 |
| 2,212,412 | Waite | Aug. 20, 1940 |
| 2,216,983 | Otto | Oct. 8, 1940 |
| 2,433,253 | Agnew et al. | Dec. 23, 1947 |

FOREIGN PATENTS

| Number | Country | Date |
|---|---|---|
| 469,124 | Germany | Dec. 3, 1928 |
| 662,327 | Germany | July 11, 1938 |
| 880,225 | France | Mar. 17, 1942 |